(12) United States Patent
Bae (10) Patent No.: US 12,473,972 B2
(45) Date of Patent: Nov. 18, 2025

(54) APPARATUS FOR CONTROLLING TRANSMISSION

(71) Applicant: SL Corporation, Daegu (KR)

(72) Inventor: Sangeun Bae, Gyeongsan-si (KR)

(73) Assignee: SL Corporation, Daegu (KR)

( * ) Notice: Subject to any disclaimer, the term of this patent is extended or adjusted under 35 U.S.C. 154(b) by 43 days.

(21) Appl. No.: 18/349,258

(22) Filed: Jul. 10, 2023

(65) Prior Publication Data

US 2024/0011556 A1     Jan. 11, 2024

(30) Foreign Application Priority Data

Jul. 8, 2022 (KR) .................. 10-2022-0084472

(51) Int. Cl.
*F16H 59/08*     (2006.01)

(52) U.S. Cl.
CPC ....... *F16H 59/08* (2013.01); *F16H 2059/081* (2013.01)

(58) Field of Classification Search
CPC ........................ F16H 59/08; F16H 2059/081
USPC ..................................................... 74/483 PB
See application file for complete search history.

(56) References Cited

U.S. PATENT DOCUMENTS

| | | | |
|---|---|---|---|
| 6,945,349 B2 * | 9/2005 | Colling | B60K 35/10 180/333 |
| 11,014,450 B2 * | 5/2021 | Keenan | F16H 59/02 |
| 2004/0110600 A1 * | 6/2004 | Sekino | F16H 61/22 477/99 |
| 2014/0345409 A1 * | 11/2014 | Watanabe | F16H 59/08 74/473.3 |
| 2015/0167827 A1 * | 6/2015 | Fett | F16H 59/02 74/473.3 |
| 2018/0038478 A1 * | 2/2018 | Arakawa | F16H 59/08 |
| 2021/0054924 A1 * | 2/2021 | Kim | F16H 59/08 |

* cited by examiner

*Primary Examiner* — William C Joyce
(74) *Attorney, Agent, or Firm* — United One Law Group LLC; Kongsik Kim; Jhongwoo Peck

(57) ABSTRACT

An apparatus for controlling a transmission using a button and a knob includes a first shift part that receives a selection command of a first shift range by a linear motion, a second shift part that receives a selection command of a second shift range by a rotational motion, and a substrate that transmits a shift control signal corresponding to the selection command inputted via either the first shift part or the second shift part. Each of the first shift part and the second shift part includes a contact part configured to contact the substrate while linearly moving in response to the first shift part or the second shift part being activated.

13 Claims, 7 Drawing Sheets

APPARATUS FOR CONTROLLING TRANSMISSION

CROSS-REFERENCE TO RELATED APPLICATIONS

This application claims priority from Korean Patent Application No. 10-2022-0084472, filed on Jul. 8, 2022, which is incorporated herein by reference in its entirety.

RELATED ART

The present disclosure herein relates to an apparatus for controlling a transmission, and more particularly, to an apparatus for controlling shift stages using a button and a knob.

An apparatus for controlling a transmission adjusts gear ratios to based on the rotation speed of the engine and the vehicle speed, and a driver manipulates a shift lever to adjust the gear ratios in the transmission.

A shift mode of the apparatus for controlling the transmission include a manual shift mode in which the driver is capable of shifting the gear stages and an automatic shift mode in which the gear stages are automatically selected based on the vehicle speed when the driver selects a driving stage D.

Even in the automatic shift mode, the driver may be required to perform gear shifting. For example, the driver needs to select a parking, reverse, neutral, or driving range.

In the automatic shift mode, various units for receiving a driver's shift selection command may be provided. For example, when the shift stage input unit is provided close to a steering wheel, the driver may more conveniently input the shift selection command.

Thus, there is a need for a means that enables the driver to input the shift selection command at a position adjacent to the steering wheel.

SUMMARY

The present disclosure provides an apparatus for controlling a transmission, which controls shift stages using a button and a knob.

The objects of the present disclosure are not limited to the aforementioned object, but other objects not described herein will be clearly understood by those skilled in the art from descriptions below.

According to an exemplary embodiment of the present disclosure, an apparatus for controlling a transmission may include a first shift part that receives a selection command of a first shift range by a linear motion; a second shift part that receives a selection command of a second shift range by a rotational motion; and a substrate that transmits a shift control signal corresponding to the selection command inputted via either the first shift part or the second shift part. Each of the first shift part and the second shift part may include a contact part that is configured to contact the substrate while linearly moving in response to the first shift part or the second shift part being activated.

The first shift range may include a parking stage. The second shift range may include a driving stage.

In an embodiment, the first shift part may include a button to receive the selection command of the first shift range; and a first contact part holder including a first contact part configured to linearly move in response to the button being pressed so as to be in contact with a first terminal provided on the substrate, and the second shift part may include a knob to receive the selection command of the second shift range.

In an embodiment, the first shift part may include an elastic part disposed between the button and the substrate to allow the button to return to its default position.

In an embodiment, the first shift part may include a button separation prevention part to prevent the button from being separated, and the button and the button separation prevention part may be coupled to each other with at least a portion of the knob disposed therebetween. In an embodiment, the button separation prevention part may include a shock-absorbing part to alleviate an impact with the knob when the button returns to its default position by the elastic part.

In an embodiment, the second shift part may include: a knob to receive the selection command of the second shift range; a pinion that is rotated as the knob is rotated; and a second contact part holder connected to the pinion to linearly move as the pinion is rotated. In an embodiment, the apparatus may further include a shift body that accommodates the second contact part holder, and the shift body may include a guide part to guide the linear motion of the second contact part holder. In an embodiment, the second contact part holder may include a second contact part configured to contact the substrate; a second holder body coupled to the guide part of the shift body so as to be linearly movable; and a holder gear that is gear-coupled to a pinion gear of the pinion.

In an embodiment, the second shift part may further include a detent part to provide tactile feedback for rotation of the knob. In an embodiment, the detent part may include: a support part on which a bullet is fixedly installed; and a groove part in which a groove is defined at a portion that is in contact with the bullet, the groove part rotating together with the rotation of the knob. In an embodiment, in response to a torque being applied to the knob to be rotated to select the second shift range, the bullet may move over the groove as the groove part rotates, and in response to the torque being removed, the knob may return to its default position by an elastic force of the bullet.

Details of other embodiments are included in the detailed description and drawings.

BRIEF DESCRIPTION OF THE DRAWINGS

The accompanying drawings are included to provide a further understanding of the present disclosure. The drawings illustrate embodiments of the present disclosure, and, together with the description, serve to explain principles of the present disclosure. In the drawings.

DETAILED DESCRIPTION

Hereinafter, exemplary embodiments of the present disclosure will be described in more detail with reference to the accompanying drawings. Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims. Like reference numerals refer to like elements throughout.

Unless terms used in the present disclosure are defined differently, all terms (including technical and scientific terms) used herein have the meaning as generally understood by those skilled in the art. Also, unless defined clearly and apparently in the description, the terms as defined in a commonly used dictionary are not too ideally or excessively construed as having formal meaning.

Figure 1:
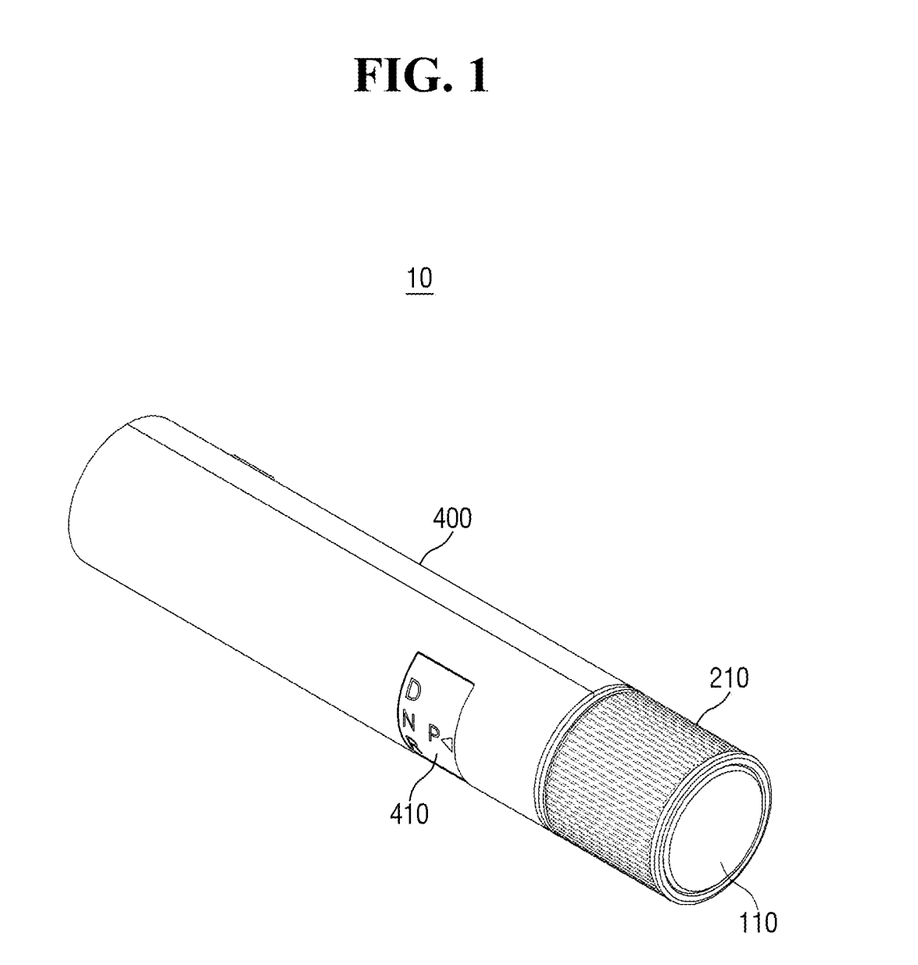
FIG. 1 is a perspective view illustrating an apparatus for controlling a transmission according to an embodiment of the present disclosure.
Figure 2:
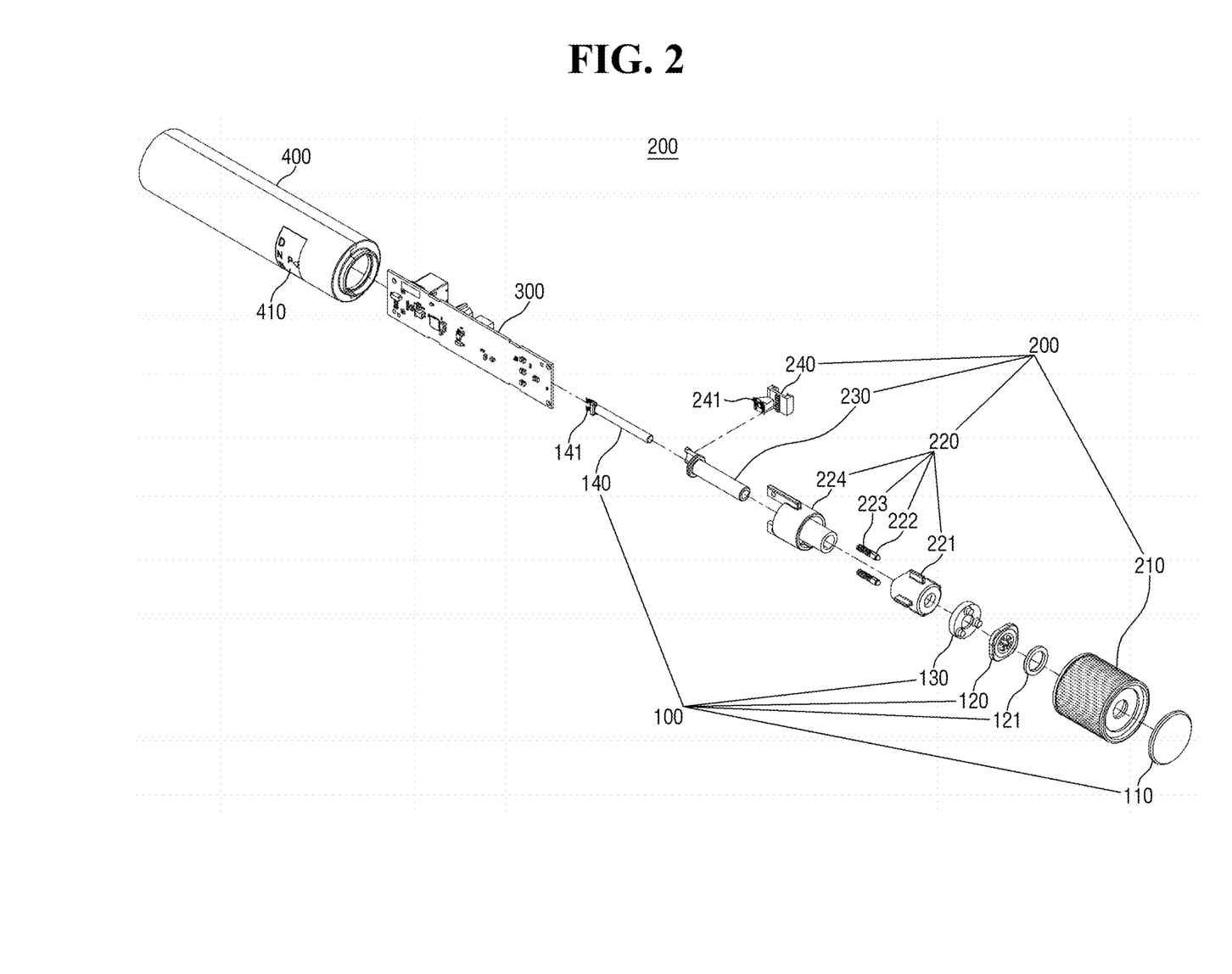
FIG. 2 is an exploded perspective view illustrating the apparatus for controlling the transmission according to an embodiment of the present disclosure.

FIG. 1 is a perspective view illustrating an apparatus for controlling a transmission according to an embodiment of the present disclosure, and FIG. 2 is an exploded perspective view illustrating the apparatus for controlling the transmission according to an embodiment of the present disclosure.

Referring to FIGS. 1 and 2, an apparatus 10 for controlling a transmission according to an embodiment of the present disclosure may include a first shift part 100, a second shift part 200, a substrate 300, and a shift body 400.

The first shift part 100 may receive a selection command of a first shift range, which may include a parking stage, by a linear motion. The second shift part 200 may receive a selection command of a second shift range, which may include a driving stage, by a rotational motion. The substrate 300 may include components thereon to transmit a shift control signal corresponding to the selection command of the first shift part 100 or the second shift part 200 to a vehicle (e.g., to an electronic central unit (ECU) of the vehicle). As the shift control signal is transmitted from the substrate 300, a transmission driving device provided in the vehicle may switch the shift stage of a transmission to a shift stage corresponding to the shift selection signal.

In the present disclosure, each of the first shift part 100 and the second shift part 200 may include a contact part that is slidable on the substrate 300. The contact part may include a brush.

The first shift part 100 may include a button 110, a first contact part holder 140, an elastic part 130, and a button separation prevention part 120.

The button 110 may receive the selection command of the first shift range. The user (e.g., the driver) may press the button 110 to input the shift selection command. The button 110 may move relative to the shift body 400. Accordingly, the button 110 may be coupled to be linearly movable with respect to the knob 210. When the user presses the button 110, only the button 110 may be moved in a state in which the knob 210 is fixed in its position.

The first contact part holder 140 may include a first contact part 141 that moves linearly on the substrate 300 when the button 110 is pressed and is in contact with a first terminal provided on the substrate 300. In response to the first contract part 141 (e.g., a brush) contacting the first terminal, the substrate 30 may transmit the selection command indicating that the parking stage is selected.

The first contact part holder 140 may linearly move with respect to a surface of the substrate 300 in response to being pressed by the button 110. The first contact part holder 140 may be in contact with the button separation prevention part 120. When the user presses the button 110, the button separation prevention part 120 may move together with the button 110. Here, the first contact part holder 140 that is in contact with the button separation prevention part 120 may also move by being pressed by the button separation prevention part 120.

The button separation prevention part 120 may prevent the button 110 from being separated. The button 110 and the button separation prevention part 120 may be coupled to each other with a portion of the knob 210 disposed therebetween. Accordingly, the button 110 coupled to the button separation prevention part 120 may be prevented from being separated from the knob 210.

In addition, the button separation prevention part 120 may relay a pressure applied to the button 110. Specifically, the button separation prevention part 120 may transmit the pressure applied to the button 110 to the first contact part holder 140. When the user presses the button 110, the button separation prevention part 120 may move together with the button 110.

The button separation prevention part 120 may include a shock-absorbing part 121 that alleviates an impact with the knob 210 when the button 110 returns from the pressed state. The shock-absorbing part 121 may alleviate the impact between the button separation prevention part 120 and the knob 210. If the user presses the button 110 and then releases the pressure, the button 110 may return to its default position by an elastic force to be described later below. While the button 110 returns to its default position, the button separation prevention part 120 may also return to its default position. As the button separation prevention part 120 returns to its default position, an impact may occur between the button separation prevention part 120 and the inside of the knob 210. The shock-absorbing part 121 may alleviate the impact between the button separation prevention part 120 and the inside of the knob 210.

The button separation prevention part 120 may be made of a solid (e.g., rigid) material, and the shock-absorbing 121 may be made of a rubber or rubber-like material having a relatively high elasticity. In some embodiments, the button separation prevention part 120 and the shock-absorbing part 121, which are made of different materials, may be coupled to each other in an insert injection method.

The elastic part 130 may be disposed between the button 110 and the substrate 300 to allow the button 110 to return to its default position. More specifically, the elastic part 130 may allow the button 110 to return to its default position by generating an elastic force. If the user presses the button 110 to input a parking stage selection command and then removes the pressure, the button 110 may return to its default position. The return of the button 110 may be performed by the elastic part 130.

The elastic part 130 may be supported by a groove part 221 so as to be fixed in its position. When the user presses the button 110, the button separation prevention part 120 may press the elastic part 130. Here, the restoration force in the elastic part 130 may increase. In addition, when the user stops the pressing of the button 110, the button 110 and the button separation prevention part 120 may return to their default positions by the restitution force exerted by the elastic part 130.

The second shift part 200 may include a knob 210, a pinion 230, a second contact part holder 240, and a detent part 220.

The knob 210 may receive a selection command of the second shift range, which may include the driving stage. The pinion 230 may rotate due to the rotation of the knob 210. The second contact part holder 240 may be gear-meshed with the pinion 230 to linearly move in response to the rotation of the pinion 230.

The shift body 400 may accommodate the second contact part holder 240 therein. The shift body 400 may include a guide part 420 that guides the linear motion of the second contact part holder 240. The second contact part holder 240 may be guided by the guide part 420, and thus, the second contact part holder 240 may linearly move inside the shift body 400.

The second contact part holder 240 may include a second contact part 241, a second holder body 243, and a holder gear 242. The second contact part 241 may be in contact with a second terminal provided on the substrate 300. The second holder body 243 may be coupled to the guide part 420 of the shift body 400 to linearly move. The holder gear may include a holder gear coupled to a pinion gear of the pinion 230.

The detent part 220 may provide tactile (e.g., haptic) feedback for the shifting operation. The detent part 220 may include a bullet 222, a support part 224, and a groove part 221.

The bullet 222 may be fixed to the support part 224. The bullet 222 may provide elastic force to the groove part 221 while being supported by the support part 224. The bullet 222 may be supported by the support part 224 with one or more springs 223 disposed between the bullet 222 and the support part 224. The bullet 222 may press the groove part 221 with respect to the support part 224 by the elastic force of the spring 223.

The support part 224 may be fixedly coupled to the shift body 400. As a result, it may be understood that the bullet 222 presses the groove part 221 with respect to the shift body 400.

In addition, the support part 224 may provide a rotational path for the pinion 230. The support part 224 may include an aperture through a central axis thereof, and the pinion 230 may be disposed to pass through the aperture. Accordingly, the pinion 230 may rotate with respect to a rotational axis, which corresponds to the central axis of the support part 224, while being supported on an inner surface of the aperture.

The groove part 221 may be fixedly coupled to the knob 210 to provide the tactile feedback when the knob 210 rotates. The user may input the shift selection command by rotating the knob 210. When the knob 210 is rotated, the groove part 221 that is fixedly coupled to the knob 210 may be rotated together. The groove part 221 may allow the user to feel the tactile feedback.

A groove GR may be defined in the groove part 221 to provide the tactile feedback. The groove GR may be defined by recessing at least a portion of a ring-shaped edge of the groove part 221 inward. Hereinafter, an edge that is not recessed on the ring-shaped edge of the groove part 221 is referred to as a reference edge, and the recessed edge is referred to as a groove edge.

Figure 3:
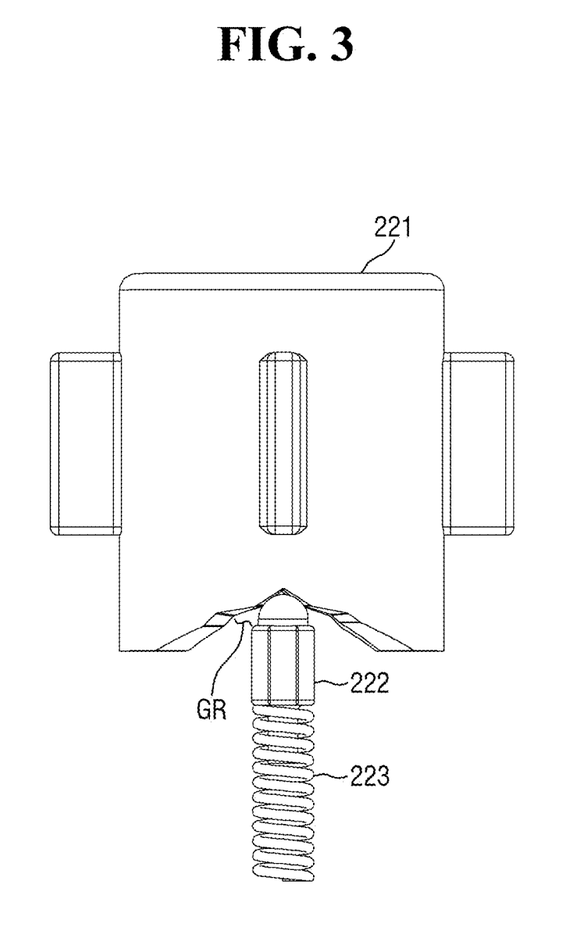
FIG. 3 is a view illustrating a first posture of a groove part according to an embodiment of the present disclosure.
Figure 4:
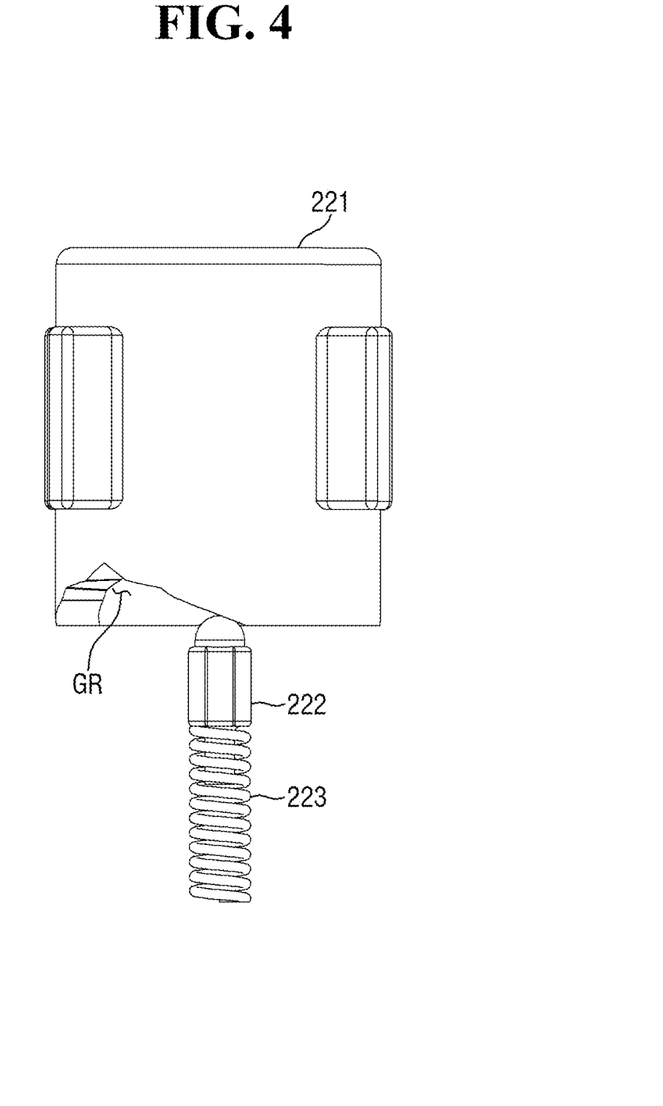
FIG. 4 is a view illustrating a second posture of the groove part according to an embodiment of the present disclosure.

Referring to FIGS. 3 and 4, the groove edge may include a plurality of inclined surfaces having different inclinations with respect to the reference edge. The bullet 222 may press the groove edge due to the spring 223. When the groove part 221 rotates, the bullet 222 may press the inclined surfaces having different inclinations. Here, an impact may occur as the inclined surfaces pressed by the bullet 222 are switched, and the impact may be transmitted to the user as the tactile feedback.

As described above, the groove part 221 may include a groove GR at a portion that is in contact with the bullet 222 which rotates together with the rotation of the knob 210. When the shift stage is selected by the rotation, the bullet 222 may move over the groove GR due to the rotation of the groove part 221, and when the knob 210 returns to its default position, the bullet 222 may move to one position by the elasticity of the bullet 222.

In the present disclosure, the shift range may include a first shift range and a second shift range. According to an embodiment, the first shift range may include a parking stage, and the second shift range may include a driving stage, a neutral stage, and a reverse stage. According to another embodiment, the first shift range may include a parking stage, and the second shift range may include a driving stage, a neutral stage, a reverse stage, and a sports stage. According to another embodiment, the first shift range may include a parking stage and a reverse stage, and the second shift range may include a drive stage and a neutral stage.

The shift body 400 may provide a reference for the motion for the first shift part 100 and the second shift part 200. In the present disclosure, the user may input the shift selection command via the liner movement of the first shift part 100 or the rotational movement of the second shift part 200 with respect to the shift body 400. For example, the shift body 400 may be fixed to a steering wheel column of the vehicle, and the user may manipulate the first shift part 100 or the second shift part that are movably coupled to the shift body 400 to input the shift selection command.

The shift body 400 may further include a display part 410 for indicating a shift stage corresponding to the shift selection command. For example, the display part 410 may be provided in the form of a liquid crystal display (LCD) to indicate the shift stages. The user may check the current shift stage via the display part 410.

In addition, the shift body 400 may accommodate at least a portion of a plurality of components constituting the apparatus 10 for controlling the transmission.

FIG. 3 is a view illustrating a first posture of the groove part, and FIG. 4 is a view illustrating a second posture of the groove part. Referring to FIGS. 3 and 4, the groove part 221 may be disposed at a first posture or a second posture. The first posture may represent a posture in which the bullet 222 presses the deepest middle portion of the groove GR, and the second posture may represent a posture in which the bullet 222 presses the edge of the groove GR.

The groove GR may be defined by being more deeply recessed in the middle thereof compared to the edges. Thus, when the external force is removed in a state in which the groove part 221 is rotated to be disposed at the second posture, the groove part 221 may return to the first posture due to the force exerted by of the bullet 222. For example, the user may apply a torque to cause the knob 210 to rotate so that the shift stage is shifted to the driving stage or the reverse stage. Thus, the groove part 221 may be switched to the second posture. After the shift stage is switched, the user may remove the torque applied to the knob 210. In response, the groove part 221 may return to the first posture by the force of the bullet 222.

Figure 5:
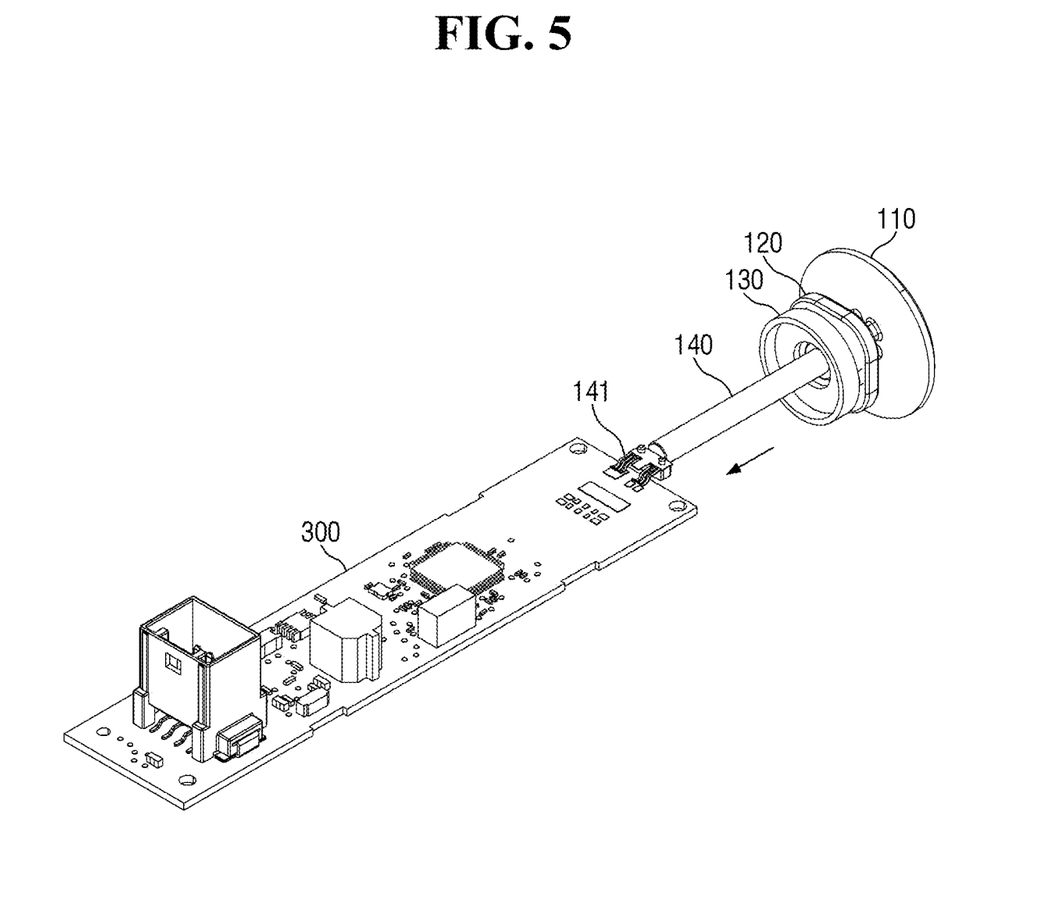
FIG. 5 is a view illustrating a state in which a first contact part holder moves by a button according to an embodiment of the present disclosure.

FIG. 5 is a view illustrating a state in which the first contact part holder moves by the button. Referring to FIG. 5, the user may press the button 110 so that the first contact part holder 140 moves.

The user may press the button 110 to input a parking stage selection command. As the button 110 is pressed, the button separation prevention part 120 and the first contact part holder 140 may move together with the button 110.

As the first contact part holder 140 moves, the first contact part 141 may be slid along the surface of the substrate 300, and the parking stage selection command may be input in response to the first contact part 141 electrically contacting the first terminals provided on the substrate 300. Thus, the substrate 300 may generate and transmit a parking stage selection signal. For example, the parking stage selection signal may be transmitted to a transmission driving device provided in the vehicle. When the parking stage selection signal is received, the transmission driving device may switch the shift stage of the vehicle to the parking stage.

After inputting the parking stage selection command, the user may release the pressure applied to the button 110. As the pressure by the user is released, the button 110 and the button separation prevention part 120 may return to their default positions by the elastic force of the elastic part 130. The first contact part holder 140 may be fixedly coupled to the button separation prevention part 120. As the button separation prevention part 120 returns to its default position, the first contact part holder 140 may also return to its default position.

Figure 6:
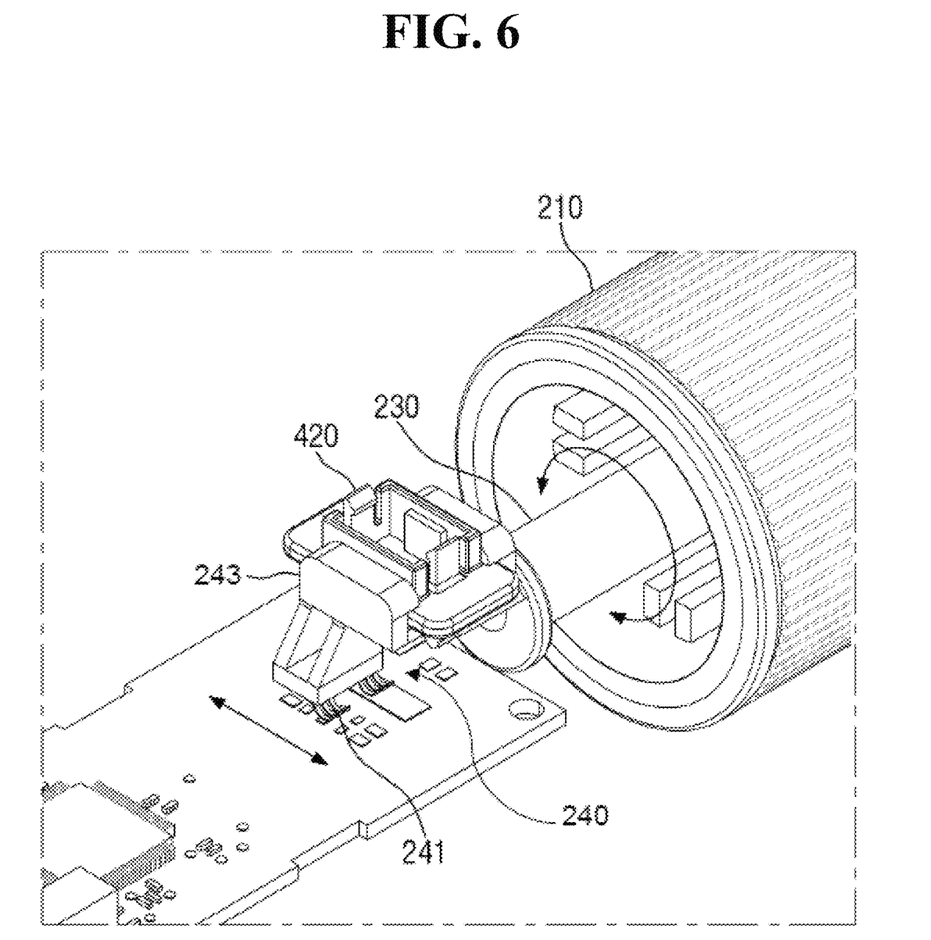
FIG. 6 is a view illustrating a state in which a second contact part holder moves by a knob according to an embodiment of the present disclosure.
Figure 7:
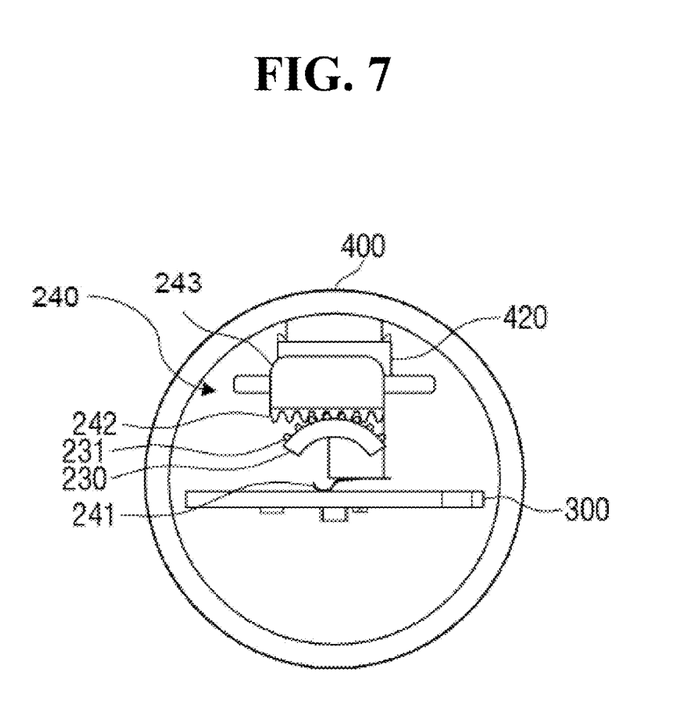
FIG. 7 is a view illustrating a state in which a pinion and the second contact part holder are gear-coupled to each other according to an embodiment of the present disclosure.

FIG. 6 is a view illustrating a state in which a second contact part holder moves by the knob, and FIG. 7 is a view illustrating a state in which the pinion and the second contact part holder are gear-coupled to each other. Referring to FIGS. 6 and 7, the user may cause the knob 210 to rotate so that the second contact part holder 240 moves.

The user may cause the knob 210 to rotate so as to input the shift selection command. As the knob 210 rotates, the pinion 230 may rotate together with the knob 210. The second contact part holder 240 may be coupled to the guide part 420 so as to be linearly movable. The guide part 420 may be coupled to the inside of the shift body 400.

The pinion 230 may include a pinion gear 231, and the second contact part holder 240 may include a holder gear 242 (implemented as, e.g., a rack gear). The pinion 230 and the second contact part holder 240 may be gear-coupled to each other through the pinion gear 231 and the holder gear 242. When the pinion 230 rotates, the second contact part holder 240 gear-coupled to the pinion 230 may be guided by the guide part 420 to move linearly along the surface of the substrate 300. Accordingly, the shift selection command may be input as the second contact part 241 provided on the second contact part holder 240 is slid along the surface of the substrate 300, thereby electrically contacting second terminals provided on the substrate 300. In response to the second contact part 241 contacting the second terminals, the shift selection command may indicate that the corresponding shift stage is selected.

As described above, in the apparatus for controlling the transmission according to the embodiment of the present disclosure, since the apparatus for controlling the transmission is provided adjacent to the steering wheel, there may be an advantage in that the driver is capable of inputting the shift selection command more easily.

In addition, since the contact unit is used instead of a magnetic Hall sensor, there may be an advantage of controlling the shift stage without being interfered by the external magnetic field.

Although the embodiment of the present disclosure is described with reference to the accompanying drawings, those with ordinary skill in the technical field to which the present disclosure pertains will understand that the present disclosure can be carried out in other forms without changing the technical idea or essential features. Therefore, the above-disclosed embodiments are to be considered illustrative and not restrictive.

What is claimed is:

1. An apparatus for controlling a transmission, comprising:
    a first shift part that receives a selection command of a first shift range by a linear motion;
    a second shift part that receives a selection command of a second shift range by a rotational motion; and
    a substrate that transmits a shift control signal corresponding to the selection command inputted via either the first shift part or the second shift part,
    wherein each of the first shift part and the second shift part comprises a contact part configured to contact the substrate while linearly moving in response to the first shift part or the second shift part being activated,
    wherein the first shift part comprises:
        a button to receive the selection command of the first shift range; and
        a first contact part holder including a first contact part configured to linearly move in response to the button being pressed so as to be in contact with a first terminal provided on the substrate, and
    wherein the second shift part comprises a knob to receive the selection command of the second shift range,
    wherein the first shift part comprises a button separation prevention part to prevent the button from being separated,
    wherein the button and the button separation prevention part are coupled to each other with at least a portion of the knob disposed therebetween, and
    wherein the button separation prevention part comprises a shock-absorbing part to alleviate an impact with the knob when the button returns to its default position by an elastic part.

2. The apparatus of claim 1, wherein the first shift range includes a parking stage.

3. The apparatus of claim 1, wherein the second shift range includes a driving stage.

4. The apparatus of claim 1, wherein the first shift part comprises an elastic part disposed between the button and the substrate to allow the button to return to its default position.

5. An apparatus for controlling a transmission, comprising:
    a first shift part that receives a selection command of a first shift range by a linear motion;
    a second shift part that receives a selection command of a second shift range by a rotational motion; and
    a substrate that transmits a shift control signal corresponding to the selection command inputted via either the first shift part or the second shift part,
    wherein each of the first shift part and the second shift part comprises a contact part configured to contact the substrate while linearly moving in response to the first shift part or the second shift part being activated, and wherein the second shift part comprises:
- a knob to receive the selection command of the second shift range;
- a pinion that is rotated as the knob is rotated; and
- a second contact part holder connected to the pinion to linearly move as the pinion is rotated.

6. The apparatus of claim 5, further comprising a shift body that accommodates the second contact part holder,
wherein the shift body comprises a guide part to guide the linear motion of the second contact part holder.

7. The apparatus of claim 6, wherein the second contact part holder comprises:
- a second contact part configured to contact the substrate;
- a second holder body coupled to the guide part of the shift body so as to be linearly movable; and
- a holder gear that is gear-coupled to a pinion gear of the pinion.

8. The apparatus of claim 5, wherein the second shift part further comprises a detent part to provide tactile feedback for rotation of the knob.

9. The apparatus of claim 8, wherein the detent part comprises:
- a support part on which a bullet is fixedly installed; and
- a groove part in which a groove is defined at a portion that is in contact with the bullet, the groove part rotating together with the rotation of the knob.

10. The apparatus of claim 9, wherein in response to a torque being applied to the knob to be rotated to select the second shift range, the bullet moves over the groove as the groove part rotates, and
in response to the torque being removed, the knob returns to its default position by an elastic force of the bullet.

11. The apparatus of claim 5, wherein the first shift range includes a parking stage.

12. The apparatus of claim 5, wherein the second shift range includes a driving stage.

13. The apparatus of claim 5, wherein the first shift part comprises an elastic part disposed between the button and the substrate to allow the button to return to its default position.

* * * * *